(12) United States Patent
Zafiroglu

(10) Patent No.: US 8,025,751 B2
(45) Date of Patent: Sep. 27, 2011

(54) NEEDLEPUNCHED NONWOVEN WITH CENTRALLY-LOCATED BINDER

(75) Inventor: Dimitri Peter Zafiroglu, Centreville, DE (US)

(73) Assignee: DZS, LLC, Midlothian, VA (US)

( * ) Notice: Subject to any disclaimer, the term of this patent is extended or adjusted under 35 U.S.C. 154(b) by 768 days.

(21) Appl. No.: 12/151,472

(22) Filed: May 7, 2008

(65) Prior Publication Data

US 2009/0280710 A1    Nov. 12, 2009

(51) Int. Cl.
*D04H 1/48* (2006.01)
(52) U.S. Cl. ........ 156/148; 156/309.6; 28/112; 442/402
(58) Field of Classification Search .......... 156/148, 156/309.6; 28/112; 442/402, 403, 407
See application file for complete search history.

(56) References Cited

U.S. PATENT DOCUMENTS

| | | | |
|---|---|---|---|
| 3,241,214 A * | 3/1966 | Smith et al. .......... | 156/148 |
| 3,245,854 A | 4/1966 | Etchison et al. | |
| 6,805,771 B1 | 10/2004 | Colson et al. | |
| 6,821,601 B2 | 11/2004 | Tsiarkezos et al. | |
| 7,090,743 B2 | 8/2006 | Colson et al. | |
| 7,122,089 B2 | 10/2006 | Zafiroglu | |
| 7,141,290 B2 | 11/2006 | Tsiarkezos et al. | |
| 7,186,451 B2 | 3/2007 | Zafiroglu et al. | |
| 2005/0003141 A1 | 1/2005 | Zafiroglu | |
| 2006/0105664 A1 | 5/2006 | Zafiroglu | |

* cited by examiner

*Primary Examiner* — Michael A Tolin
(74) *Attorney, Agent, or Firm* — The H.T. Than Law Group

(57) ABSTRACT

The present invention concerns a process for forming a wearable and functional fabric from a composite material comprising a nonwoven face layer containing a plurality of fibers, and at least one thermoplastic binder layer disposed underneath. The fibers are initially arranged in a generally planar web and subsequently needlepunched through at least one binder layer. The fiber layers can also be placed on both sides of one or more centrally-located binder layers, and further reinforced with scrims. In an innovative aspect of the invention, the composite is heated under low and uniform pressure to remove thermal stresses, resulting in at a least one relatively smooth face that can be coated to form a wearable fabric, e.g., artificial leather, odor absorbing fabric, and the like.

29 Claims, 13 Drawing Sheets
(9 of 13 Drawing Sheet(s) Filed in Color)

$h \leq \frac{1}{3} H$

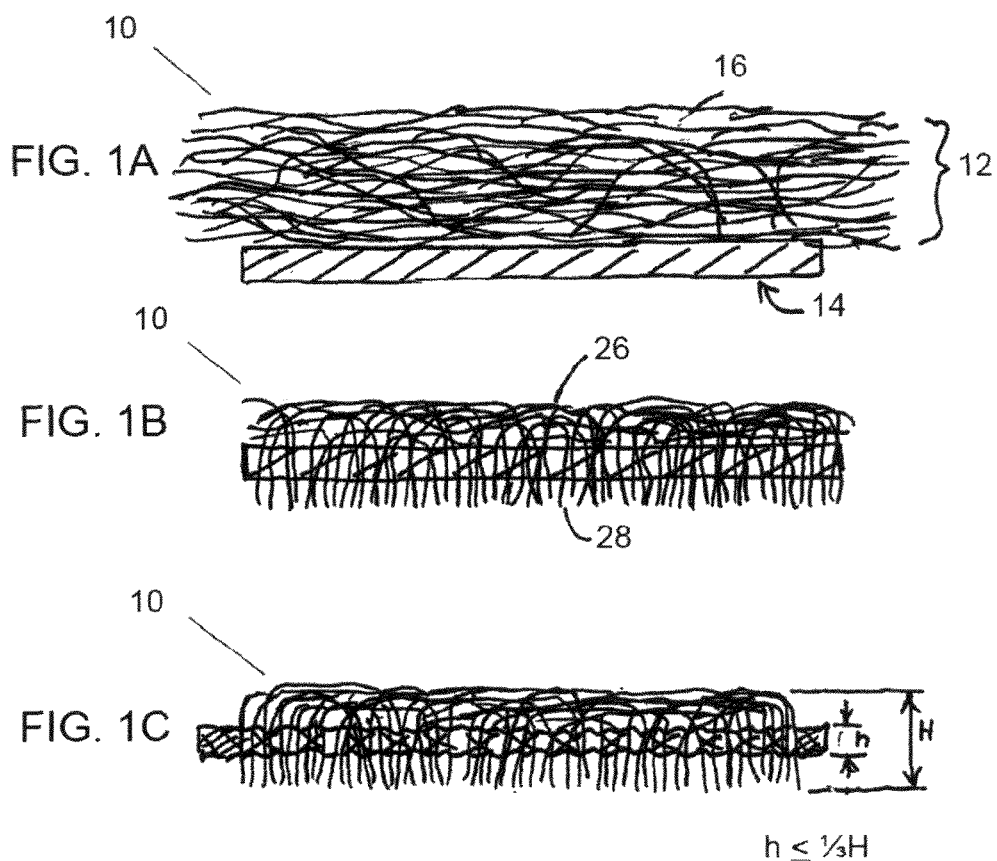

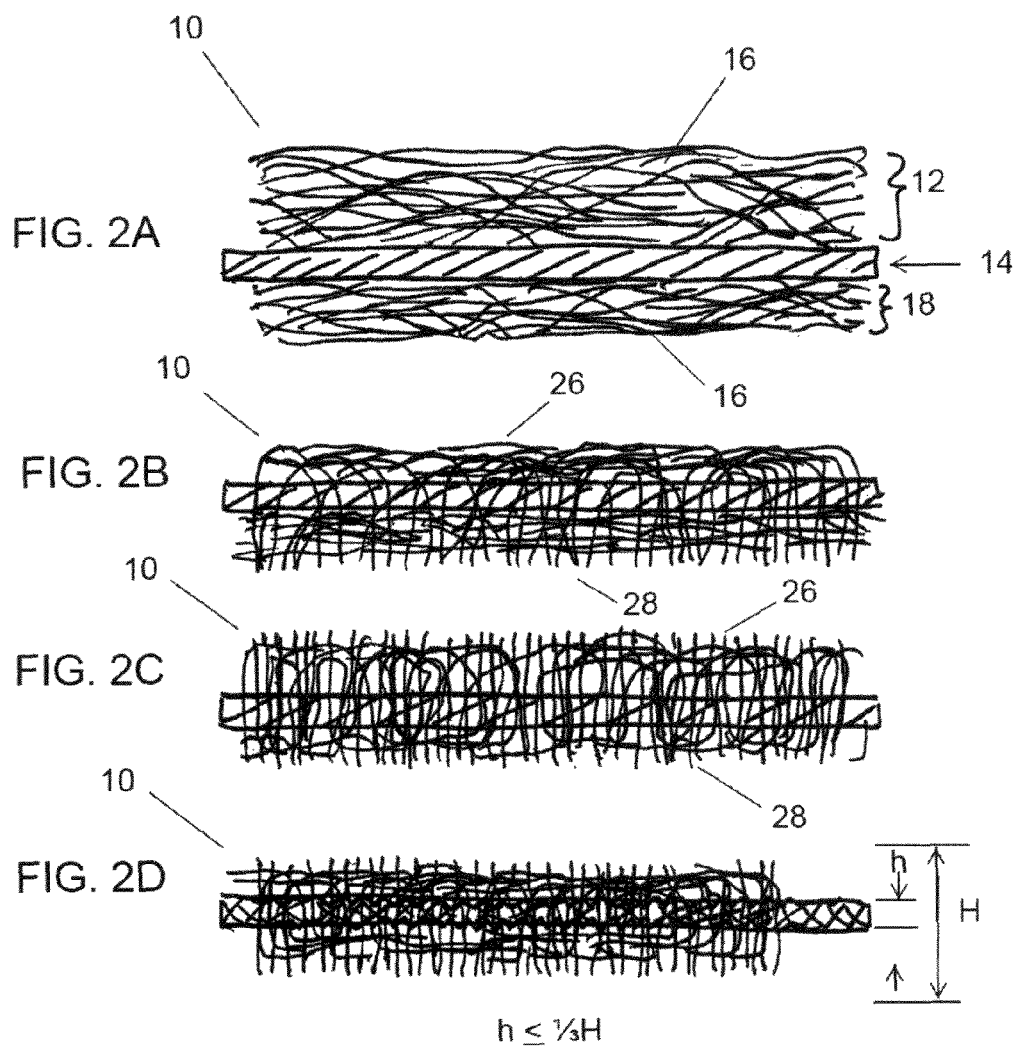
$h \leq \frac{1}{3}H$

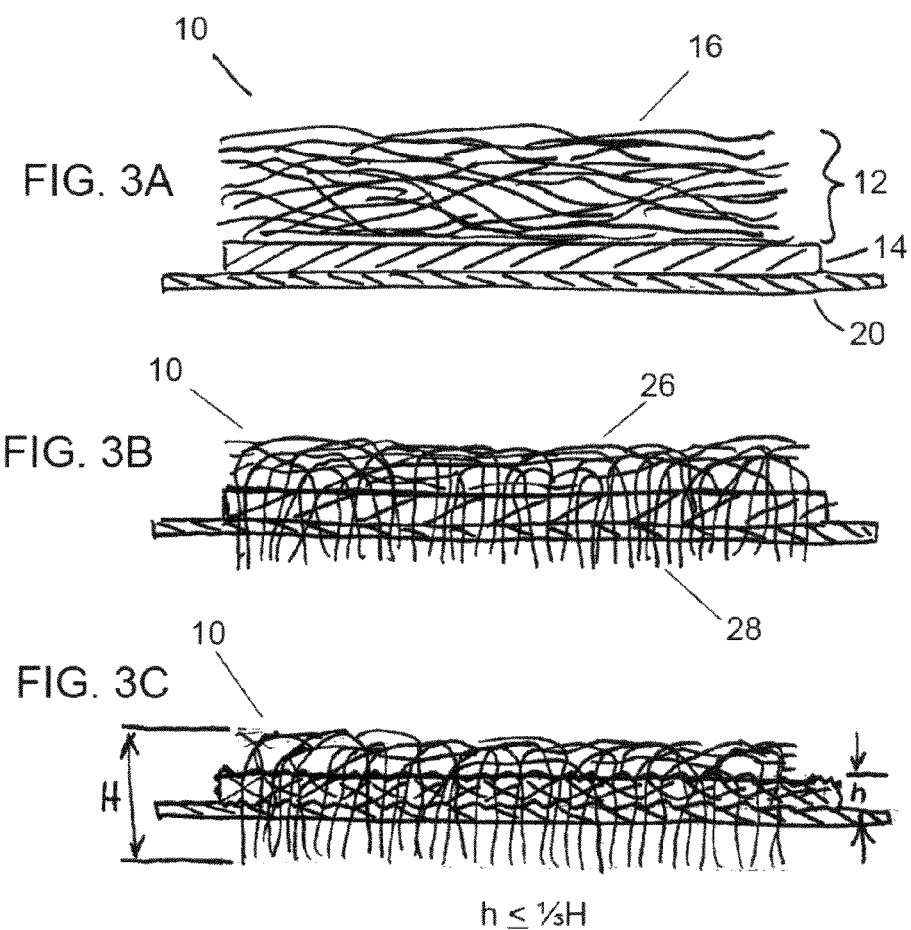
$h \leq \frac{1}{3}H$ $h \leq \frac{1}{3} H$

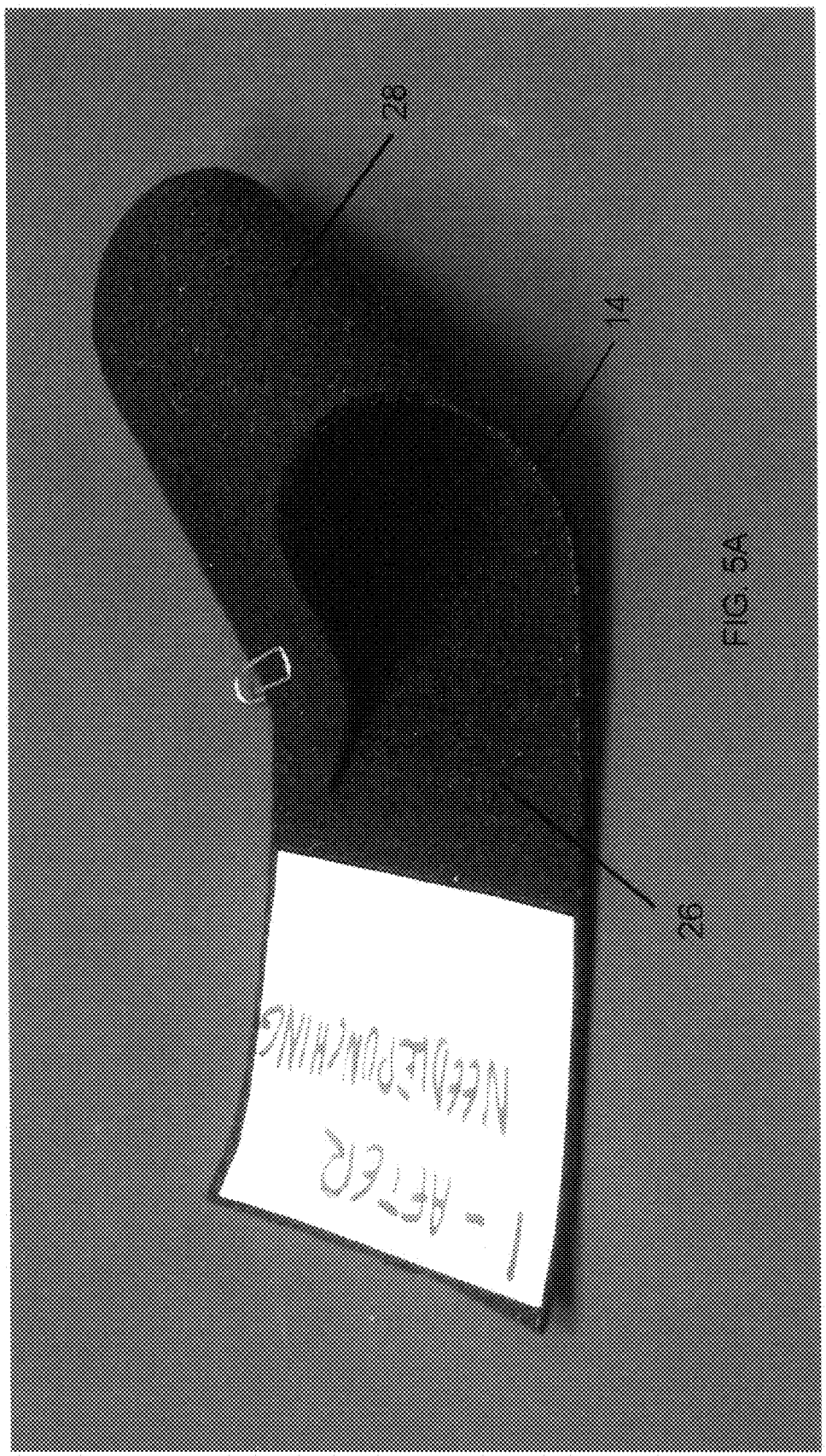

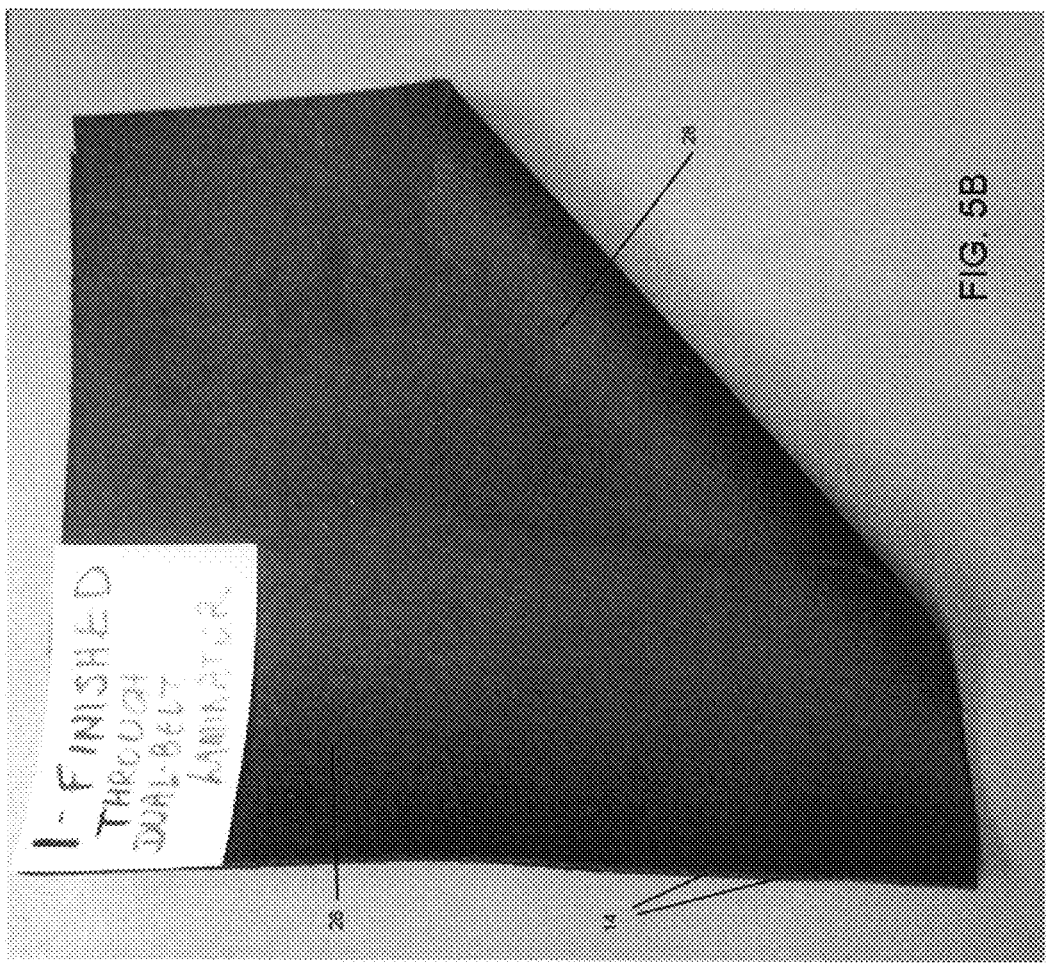

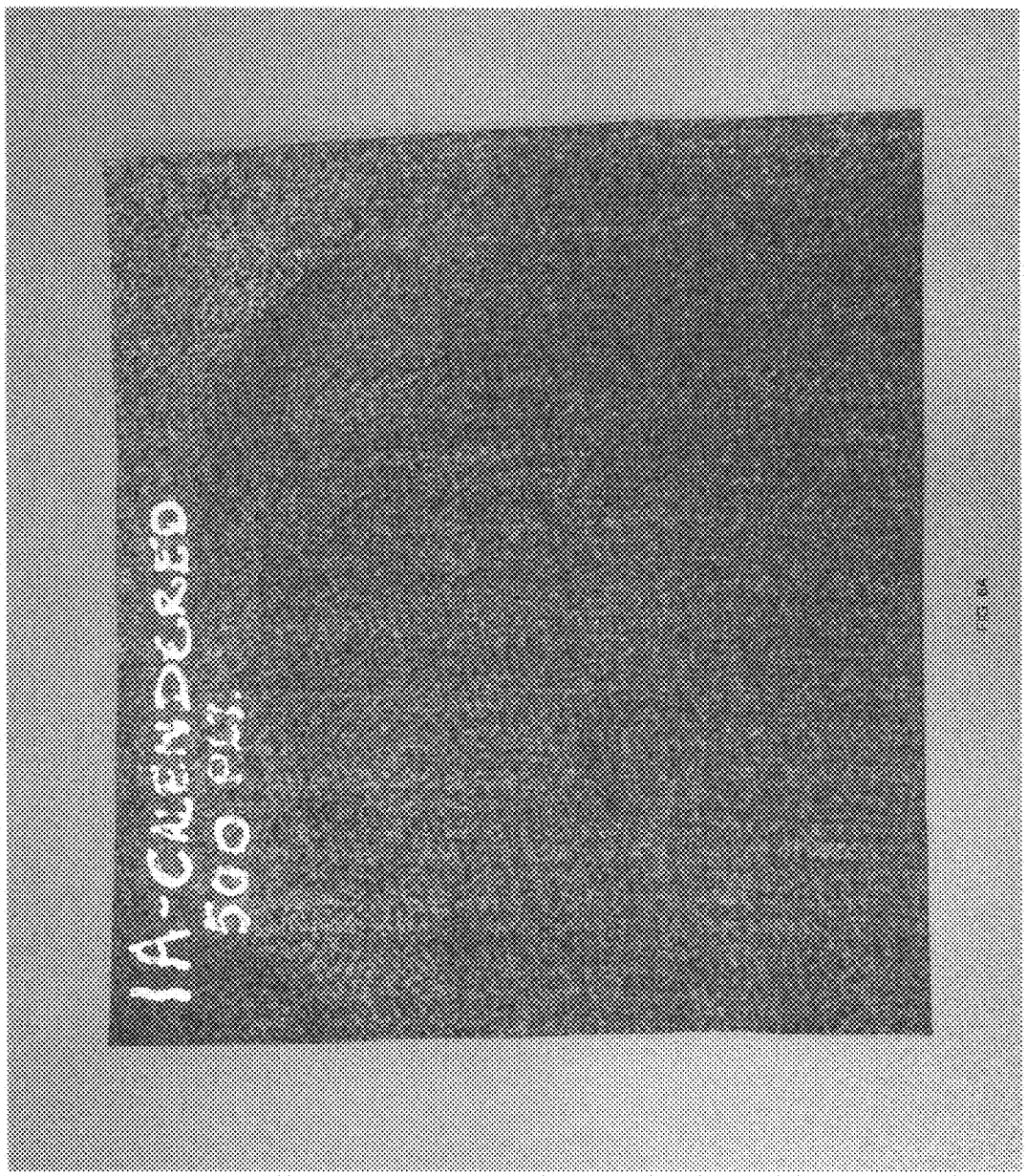

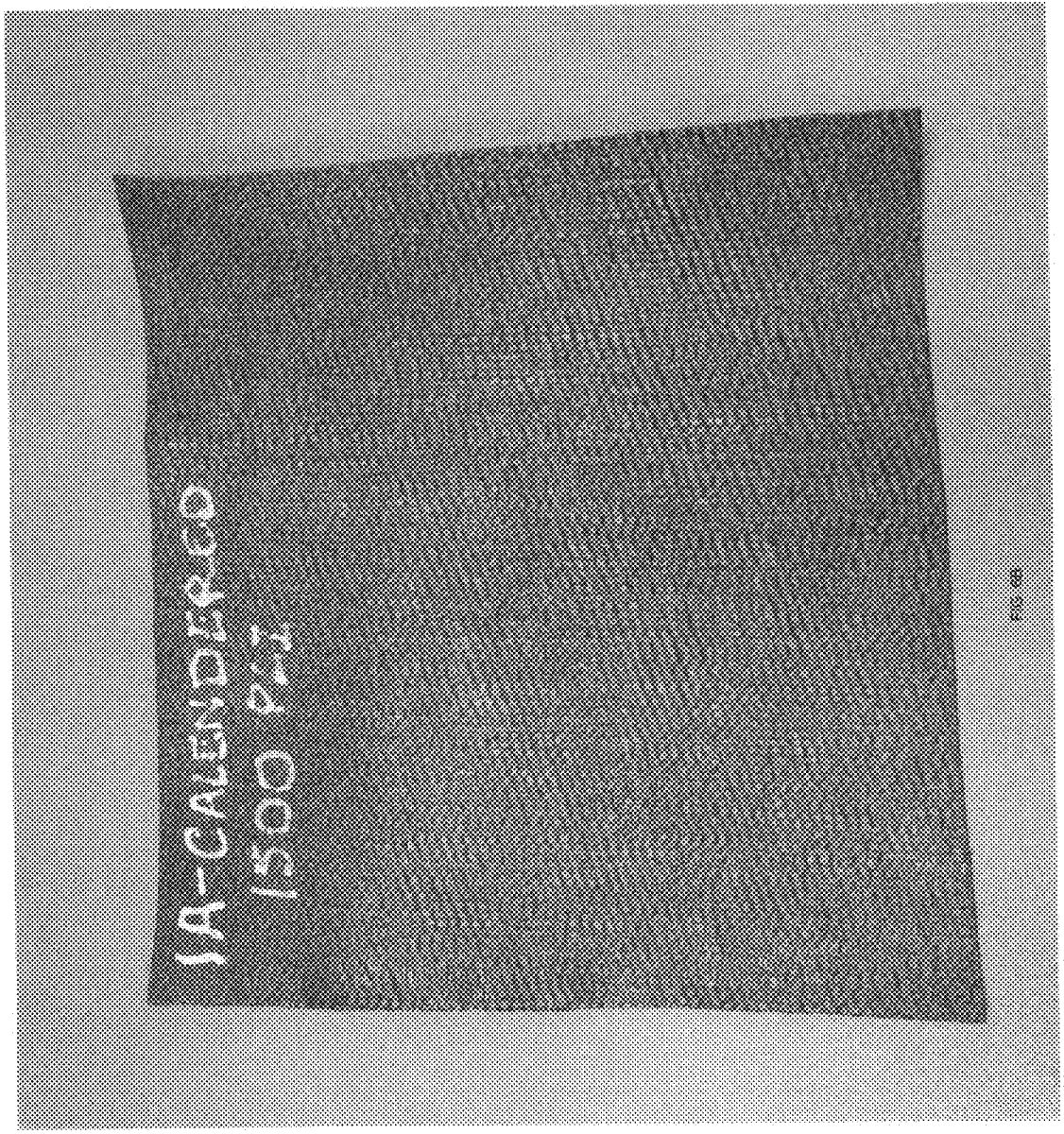

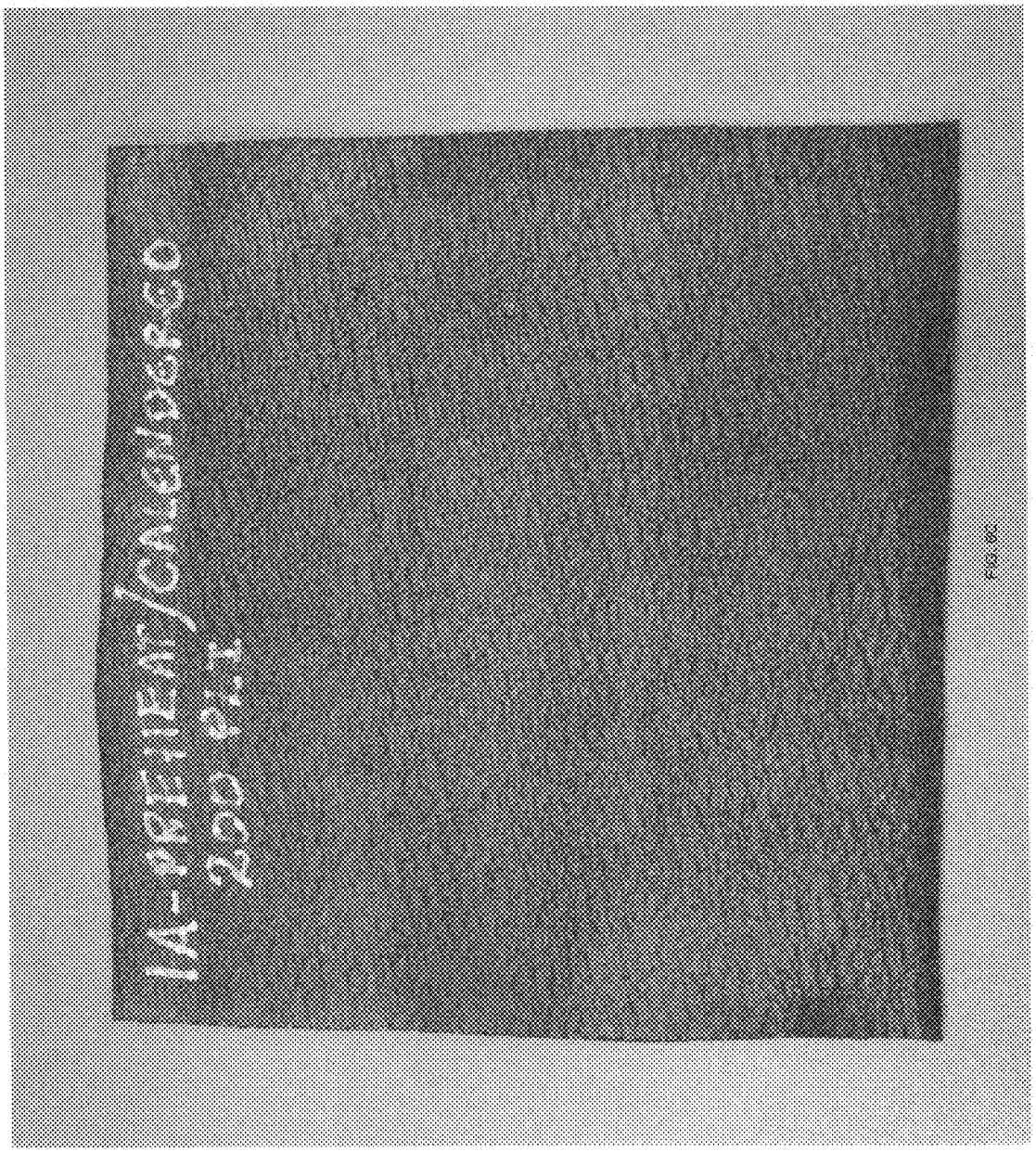

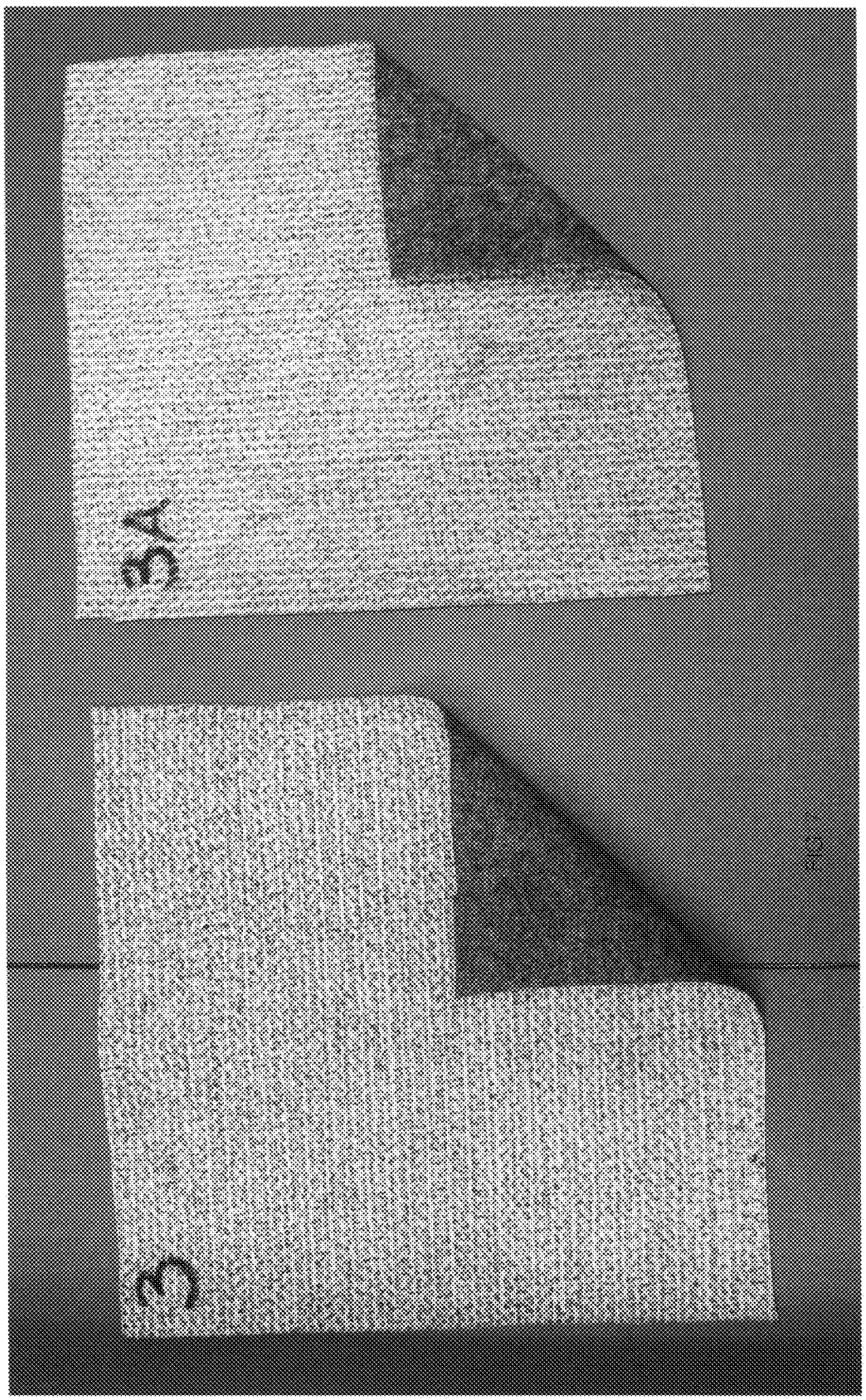

NEEDLEPUNCHED NONWOVEN WITH CENTRALLY-LOCATED BINDER

FIELD OF THE INVENTION

The present invention relates to a process for forming a wearable fabric. More specifically, the present invention relates to a process involving forming and finishing a needlepunched nonwoven fabric, comprised of at least one centrally located or centrally restricted binder layer, that can be used as a precursor to artificial leather as well as a coating substrate, insulative apparel, filtration medium, and the like.

BACKGROUND OF THE INVENTION

Adhesive resins are traditionally used to supplement the properties of nonwoven fabrics. The adhesive resins can impart durability, dimensional stability, abrasion resistance, facial density and other similar properties to nonwoven fabrics. In one particular application, adhesive resins can be used in substrates for artificial or synthetic leathers. More specifically, the adhesive resin, usually in a soft, elastic and porous form, can serve as a filler, uniformizer and stabilizer. The adhesive resin is applied to one or both surfaces of the substrate or, alternatively, is used to impregnate the entire nonwoven fabric. After applying the adhesive resin, the nonwoven fabric is then usually finished by sanding, or brushing and shearing, to create a smooth surface. Uniform internal density is required for the leather-like product so that it does not develop an undesirable roughened surface, usually known as "orange peel," when it is subsequently formed over curved surfaces such as, for example, on footwear, luggage and similar applications. Extra layers may also be laminated on the nonwoven fabric to improve appearance or physical properties.

The Kirk-Othmer Encyclopedia of Chemical Technology, Fourth Edition, John Wiley & Sons, Inc., Volume 15, "Leather-like Materials" p. 177-192, (1995) summarizes the development of artificial leather materials. The encyclopedia notes that in the 1930s, a plasticized poly(vinylchloride) film coated onto a woven or knitted fabric was developed as a leather-like material, but the material was stiff, exhibited plasticizer migration and had extremely low permeability, poor flex endurance and a cold touch. In the 1960s, synthetic leather materials having improved appearance, feel and resistance to grain breakage were made by laminating a cast polyurethane film to a brushed fabric. Further improvements in flexibility were achieved with the introduction of poromeric polyurethane-coated fabrics which were produced by applying a solution of a polyurethane resin in an organic solvent to a brushed fabric and then immersing the fabric in a nonsolvent bath (e.g., water) to coagulate the polyurethane and form the poromeric structure. Typically, a polyurethane film was applied atop the poromeric structure. Polyurethane-impregnated and coated nonwoven fabrics made with ultra-fine fibers or microfibers (i.e., of less than 0.3 denier) also were developed to produce suede-like and other leather goods. Broadly, poromerics or poromeric imitation leathers are synthetic breathable leather substitutes. The term poromeric was coined by DuPont as derivatives of the terms microporous and polymeric.

Combinations of various woven or knitted fabrics with nonwoven materials also have been disclosed for use in making artificial leather. For example, U.S. Pat. No. 5,256,429, entitled "Composite Sheet for Artificial Leather," to Honda et al., discloses making a composite sheet, with a high surface density without stiffness, by needle punching a surface layer of special staple fibers of very low denier into a tightly woven or tightly knit fabric of high twist multifilament yarn and then coating or impregnating the resulting structure with a binder. The special fibers are formed from "islands-in a-sea" composite fibers by dissolving the polymeric "sea" surrounding "islands" of a second polymer to leave fibers of very low titre (i.e., 0.001 to 0.1 denier). However, making artificial leather products from "islands-in-a-sea" fibers is costly.

U.S. Pat. No. 4,073,988, entitled "Suede-like Artificial Leathers and a Method for Manufacturing Same," to Neshida et al., discloses an artificial suede leather made from pile-like fibers by subjecting the fibers to a heat treatment and a swelling treatment before impregnating or coating the fibers with a synthetic polymer solution or emulsion. The solution or emulsion is then coagulated, and dried. The sheet is then buffed to raise naps. The filaments making up the pile-like fibers have complex cross-sections, created by bonding different polymers having mutually low adhesive affinity with each other. An additional buffing step is required to produce raised naps.

U.S. Pat. No. 4,329,390, entitled "Method for Making Leather like Materials (B)," to Civardi et al. discloses a synthetic leather-like sheet made from laminating a thin microporous elastomeric layer, a fibrous backing and a very thin preformed skin. The thin preformed skin is embossed to create a grain appearance.

U.S. Pat. No. 5,922,445, entitled "Composite Material and Process for Production of Same," to Yoshida et al. discloses another leather-like composite sheet. The composite sheet is obtained by coating or impregnating a fibrous base material with an elastic polymeric substance, in which the fibers constituting the fibrous base material and the elastic polymeric substance are prevented from bonding with each other. This sheet may be produced by applying a hydrophobicizing treatment to the fibrous base material, then impregnating or coating a solution of the elastic polymeric substance to which a hydrophilic silicone has been added, and wet solidifying.

Stitch-bonded composites suitable for use as artificial leather substrates are disclosed in U.S. Pat. No. 5,707,710 entitled "Composite Sheet for Artificial Leather" to Zafiroglu, U.S. Pat. No. 6,063,473, entitled "Abrasion-Resistant Composite Sheet" also to Zafiroglu, U.S. Pat. No. 6,407,018 B1 (col. 5, ln. 47 to col. 6, ln. 13), entitled "Stitchbonded Fabric and Process for Making Same" also to Zafiroglu, and U.S. Pat. No. 7,186,451, which is incorporated herein by reference in its entirety, entitled "Composite Sheet Suitable for Use as Artificial Leather" to Zafiroglu et al.

U.S. Pat. No. 3,245,854, entitled "Process of Manufacturing Nonwoven Fabrics," to Etchison et al., discloses a low-cost process comprising the needlepunching of fibers into a thermoplastic film, followed by the application of heat through an oven, or through an oven and a calender, to melt the film. The surfaces of the nonwoven fabric do not become flat until the product is heated and calendered. Further, the molten film fuses and permeates throughout the needlepunched web. Thus, while this technique produces cohesive and durable or moldable products, which may be suitable as coating substrates, it is insufficient in other aspects. Particularly, the technique fails to produce the internal uniformity and the smooth surfaces required for many artificial leather applications, unless it is followed by the addition of resins, as well as mechanical surface finishing. Moreover, calendering densifies and exaggerates minor internal nonuniformities such as those resulting from web forming patterns or needling patterns, thereby exacerbating the "orange peel" effect.

Co-pending, commonly owned U.S. application Ser. No. 10/611,769 and U.S. application Ser. No. 11/284,377, by the same inventor, disclose needlepunched products which were also found unsuitable for artificial leather. The '769 application discloses in one embodiment the needlepunching of fibers into a thermoplastic adhesive layer followed by the application of highly concentrated heat and pressure exclusively from the needle-exit side; melting the thermoplastic adhesive layer; and bonding and anchoring the fibers in the adhesive layer which enters the fibrous layer in the back. The composite is attached with heat and pressure to a backing. The '377 application discloses similarly needlepunched structures, optionally shrunk after needling, and finished with heat and pressure applied from the needle-exit side, resulting in a thin, densified and resin-rich abrasion-resistant backface.

While the aforementioned leather substrate materials function well to various degrees, there remains a need in the art for lower-cost composite sheets with a smooth and uniform surface as well as a uniform internal structure, having a combination of uniform conformability, thermal stability, moldability, crease-resistance, tear-resistance, odor absorption and other desirable properties.

SUMMARY OF THE INVENTION

The present invention concerns a process of forming a wearable fabric. A precursor fabric, i.e. a needlepunched nonwoven fabric, is used as a platform to make the wearable fabric. The precursor fabric is formed by a process comprising the steps of (i) providing a composite comprising at least one web of staple fibers, and at least one thermoplastic binder layer; (ii) needlepunching the staple fibers from at least one web of staple fibers into and through the thermoplastic binder layer, wherein ends of fibers originating from the needle-entrance side substantially cover the opposite needle exit-side, and wherein the density of needlepunching penetrations is greater than about 40 penetrations per cm$^2$; (iii) restraining the composite between two smooth surfaces of an apparatus, which are positioned to apply uniform pressure under about 50 psi throughout the upper and lower surfaces; and (iv) heating the composite, while continuing to restrain the composite, for a finite time period to remove the thermal stresses in the composite, wherein each thermoplastic binder layer is fully melted and the staple fibers are not melted, deformed or decomposed, wherein all molten thermoplastic is confined to a thickness smaller than or equal to about one-third of the thickness of the whole composite, and wherein the molten thermoplastic does not extend into either the upper surface or lower surface. The precursor fabric is provided with at least one finishing substance such as polyurethane, carbon paper, gas or odor absorbing materials, fragrance releasing materials, ultraviolet protective materials (e.g., ultraviolet-reflecting particles, powders, etc.), thermal insulators, fire-retardant materials, electrical conductors, electrical insulators, heating elements, anti-microbial materials, electromagnetic or microwave insulators, or combinations thereof. The finishing substance allows the precursor fabric to be finished as a wearable fabric, such as artificial leather, odor absorbing fabric, protective apparel, and the like.

In one alternate embodiment, the wearable fabric can be formed from a composite comprising both a fibrous face layer and fibrous back layer, which may be reinforced by scrims. In yet another alternate embodiment, the wearable fabric can be formed from a composite comprising at least one secondary layer, such as a particulate layer, adjacent to at least one thermoplastic binder layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the accompanying drawings, which form a part of the specification and are to be read in conjunction therewith and in which like reference numerals are used to indicate like parts in the various views:

FIG. 1A is a schematic cross-sectional view of a nonwoven face layer positioned on top of a thermoplastic binder layer; FIG. 1B is a schematic cross-sectional view of the layers of FIG. 1A after being needlepunched; FIG. 1C is a schematic cross-sectional view of the needlepunched composite of FIG. 1B after heat activation of the thermoplastic binder layer under low pressure and planar restraint.

FIG. 2A is a schematic cross-sectional view of a nonwoven face layer positioned on top of a thermoplastic binder layer, which is positioned on top of a nonwoven bottom layer; FIG. 2B is a schematic cross-sectional view of the layers of FIG. 2A after being needlepunched from the nonwoven face layer; FIG. 2C is a schematic cross-sectional view of the layers of FIG. 2B after being needlepunched from the nonwoven bottom layer; FIG. 2D is a schematic cross-sectional view of the layers of FIG. 2C after heat activation of the thermoplastic binder layer under low pressure and planar restraint.

FIGS. 3A, 3B and 3C are schematic cross-sectional views of a composite, respectively corresponding to FIGS. 1A, 1B and 1C, with a layer of reinforcing scrim or flow-limiting membrane positioned beneath the thermoplastic binder layer.

FIG. 5A is a photograph of a precursor composite of example 1; FIG. 5B is a photograph of a subsequent precursor of example 1.

FIGS. 6A, 6B and 6C are a series of photographs of samples of comparative example 1A.

FIG. 7 is a photograph of samples of example 3 and comparative example 3A.

DETAILED DESCRIPTION OF THE INVENTION

Figures 4A, 4B, 4C:
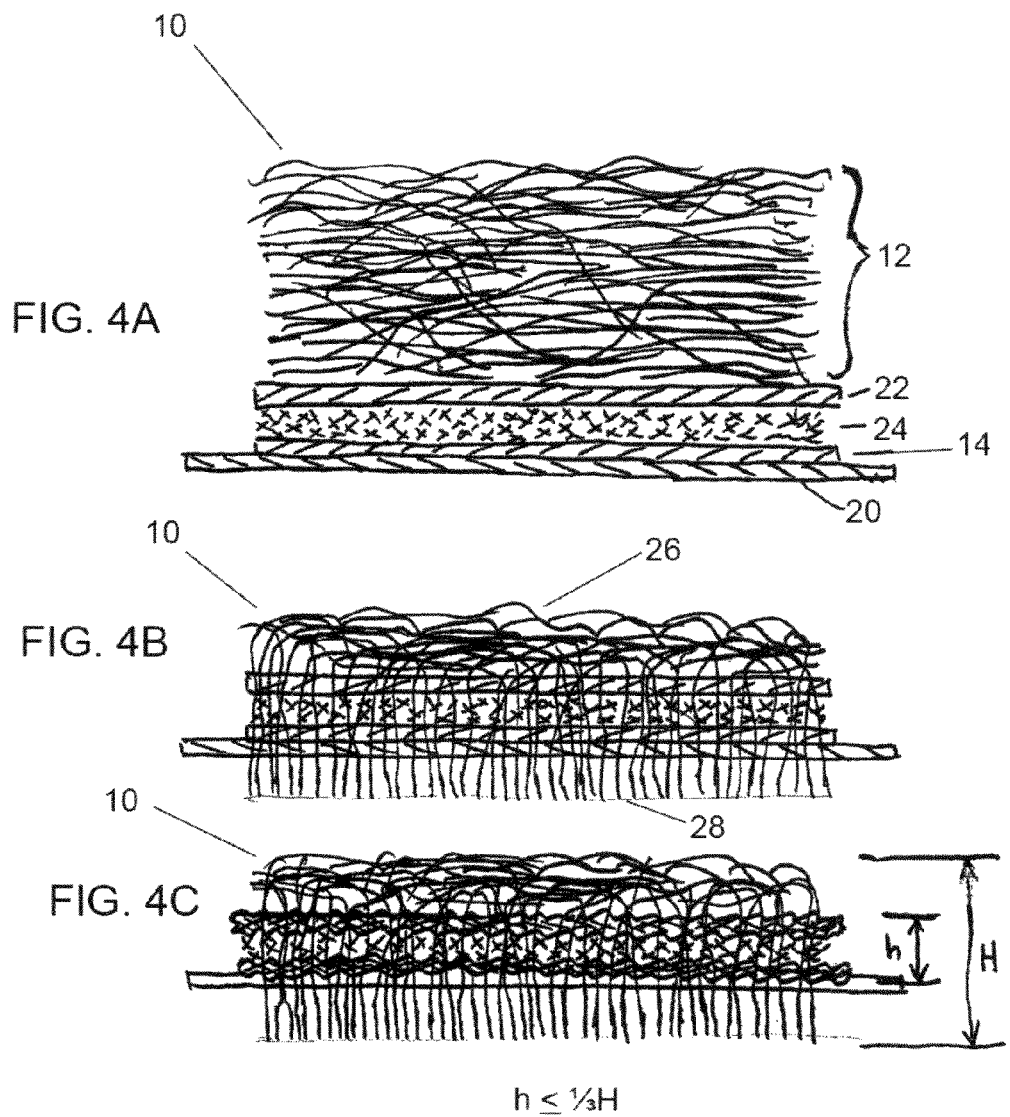
FIGS. 4A, 4B and 4C are schematic cross-sectional views of a composite, respectively corresponding to FIGS. 3A, 3B and 3C, with a layer of active particulates positioned between two thermoplastic binder layers.

The present invention relates to a process for forming a wearable fabric. Unlike prior art methods that use apparatuses such as pin tenters, ovens or calenders to retain, heat or pressurized composites, this inventive process advantageously relieves thermal stresses by heating a needlepunched multi-layer nonwoven composite as it is restrained between two smooth surfaces of an apparatus, which are positioned to apply uniform pressure under about 50 psi throughout the area of the upper and lower surfaces of the composite. Moreover, the molten thermoplastic binder within the composite does not extend into the upper and lower surfaces. This process is advantageous because it creates an exceptionally smooth and uniform needlepunched nonwoven fabric that can be used as a precursor to wearable fabrics, such as artificial leather, odor absorbing fabric, protective apparel, coating substrate, insulative apparel, filtration medium, and the like.

As shown in FIGS. 1-4, this process involves, among other things, forming and finishing a needlepunched nonwoven fabric beginning from a multi-layer composite 10 comprising a fibrous face layer 12 and at least one thermoplastic binder layer 14. This precursor fabric can be formed by a process comprising the steps of (a) needlepunching staple fibers 16 from at least one side of the fibrous face layer 12 into and through at least one thermoplastic binder layer 14; (b) subjecting the needled composite to planar constraint, and applying low and uniform pressure to its upper and lower surfaces 26, 28; and (c) heating the composite 10, while continuing to restrain the composite 10, for a finite time period to remove substantially all thermal stresses in each thermoplastic binder layer 14, wherein each thermoplastic binder layer 14 is fully melted but the staple fibers 16 are not melted, deformed or decomposed, and wherein the molten thermoplastic does not extend into either the upper surface 26 or lower surface 28. In alternate embodiments of the invention, the above process can be also be used to form and finish needlepunched nonwoven fabrics from multi-layer composites 10 that comprise more than two layers including a fibrous bottom layer 18 (as shown in FIGS. 2A-2D), a reinforcing scrim layer 20 (as shown in FIGS. 3A-3C), an additional thermoplastic binder layer 22 (as shown in FIGS. 4A-4C), and secondary layers such as particulate layer 24 (also shown in FIGS. 4A-4C).

The precursor or base fabric can be used as a platform for the manufacture of wearable fabrics such as artificial leather, odor absorbing fabrics, protective apparel, and the like. A wearable fabric can be manufactured by providing the precursor or base fabric with at least one finishing substance to improve the wearability and functionality of the precursor fabric. The finishing substance can be added to the precursor fabric before or after needlepunching and finishing it. The finishing substance can be provided in a secondary layer, as shown in FIGS. 4A-4C and discussed below. The finishing substance can also be applied in the form of powder, fibrils or fibers, liquids or gels. In another alternative, the finishing substance can be provided on the upper surface 26, the lower surface 28, or both. Suitable finishing substances include, without limitation, polyurethane, carbon paper, gas or odor absorbing materials, fragrance releasing materials, ultraviolet protective materials (e.g., ultraviolet-reflecting particles, powders, etc.), thermal insulators, fire-retardant materials, electrical conductors, electrical insulators, heating elements, anti-microbial materials, electromagnetic or microwave insulators, or combinations thereof.

A person of ordinary skill in the art would readily appreciate the various performance characteristics of the finishing substances mentioned above. As shown in Examples 1 and 2 below, polyurethane can be used to coat the upper or lower surfaces 26, 28 of the precursor fabric, thereby fabricating artificial leather. As shown in Example 3 below, carbon paper can form a secondary layer 24, thereby forming a gas and odor-absorbent fabric. Electrical conductors such as copper or aluminum or carbon can also be placed in the precursor fabric in order to provide an electrical gateway for personal electronic items such as MP3 players, e.g. the Apple iPOD®. In one example, electrical conducting material can be adhered to the adhesive layer 14 and the wearable fabric is made into a jacket. This jacket can be connected to a battery or other power sources and an MP3 player at the waist or in a pocket and an earphone can be connected to the collar, proximate to the wearer's ears.

In order to retain its performance characteristics, the finishing substance should be capable of maintaining fine-scale uniformity through the steps of needlepunching and finishing. As used herein, the term "fine-scale uniformity" means avoiding the creation or amplification of small holes, cracks, folds, local weight variations or local densifications in the substrate. For instance, if a carbon paper is to retain its gas or odor absorbing capability, then it should maintain the fine-scale uniformity of itself or the composite. Such maintenance of fine-scale uniformity can be accomplished by needlepunching composite 10 with very fine needles that make negligibly small holes and finishing composite 10 without allowing it to shrink, expand, or be compressed in a manner that moves materials sideways. As used herein, the term "carbon paper" refers to a fibrous sheet containing activated carbon granules attached to the fibers. For example, the fibrous sheet can be a nonwoven dipped in or sprayed with a slurry comprising carbon powder, dissolved adhesive, and water. Subsequently, the fibrous sheet is squeezed and dried. The carbon powder is held by the adhesive to the fibrous sheet.

Referring back to FIGS. 1A-1C, in accordance with one aspect of the present invention, composite 10 comprises two layers, a fibrous face layer 12 and a thermoplastic binder layer 14. The fibrous face layer 12 comprises a substantially planar web of unbonded and unentangled staple fibers 16 that are needlepunched through thermoplastic binder layer 14, as seen in FIG. 1B. The staple fibers 16 can be needlepunched from the web side, or alternatively first from the web side and then from an opposite side. The ends of fibers 16 originating from the needle-entrance side, such as upper surface 26, substantially cover the opposite needle exit-side, such as lower surface 28. An innovative aspect of the present invention is that the uniform pressure and heat applied evenly throughout the surface of composite 10 does not create any localized pressure lines which can occur using a calender, or localized expansion or contraction, which can occur if the composite 10 is processed through an oven or held by a pin tenter. This inventive process relieves local stresses in the composite 10, when the needlepunched composite 10 is subjected to heat while constrained in a planar configuration under low and uniform pressure. The low and uniform pressure is preferably under about 50 psi, more preferably under about 20 psi, and most preferably under about 10 psi. The temperature of composite 10 is elevated above the melting point of the thermoplastic binder layer 14, but below the melting point or decomposition point of fibers 16. The temperature of composite 10 is elevated preferably at least about 10° C., more preferably at least about 30° C., and most preferably at least about 50° C. above the thermoplastic binder layer 14.

Any suitable heating tool that has smooth two-dimensional surfaces, including but not limited to a dual-belt laminator, flat hot press, or rotating smooth heated drum wrapped with a smooth moving belt, can be used to apply heat to the needle exit side, or preferably both the needle-exit side and needle-entrance side. Such smooth heating tools are preferably used to restrain both the upper surface 26 and lower surface 28. As a consequence of applying heat under planar restraint, the thermoplastic binder layer 14 is fully melted and built-in thermal stresses are removed from binder layer 14, whereas the staple fibers 16 are not melted or decomposed. Subsequent cooling, preferably with smooth similar heating tools restraining both the upper surface 26 and lower surface 28, is important for products such as leather substrates that need to be post-coated or post-formed under moderately raised temperatures, usually up to 150° C.

After cooling thermoplastic binder layer 14, the resulting molten and re-solidified thermoplastic is confined to a thickness "h" that is smaller than or equal to about one-third of the thickness "H" of the whole composite 10, as shown in FIG. 1C. The segments of staple fibers 16 passing through the thermoplastic binder layer 14 remain oriented vertically with respect to the plane of the composite 10, and are fused to each other in the vertical position by the molten thermoplastic adhesive 14. The molten thermoplastic adhesive 14 does not propagate to either outer surface 26 or 28, thus limiting any bonding to the interior of composite 10. This aspect of the invention is important because the interior confinement of adhesive 14 allows the outer surfaces 26, 28 to accept coating materials including, but not limited to, polyurethane, vinyl, acrylic and the like, which can be used to form artificial leather and similar sheet structures.

Advantageously, the relatively low uniform pressure and heating process of the present invention set all fibers within a uniform planar space. Consequently, built-in thermal stresses are released, and there is no adhesive consolidation or permeation to the outer top or bottom surfaces. The inventive method contrasts with the prior art. One specific prior art technique involves the use of pin tenters to restrain needlepunched composites, resulting in uneven stretching or shrinking of edges and midspans, and nonuniform and localized residual thermal stresses.

Another feature of this invention is that the needled precursor composite 10 is not allowed to shrink or expand as the thermoplastic binder layer 14 is heated. The differential planar expansion or differential shrinking of an adhesive layer, or web of staple fibers, can result in spotted thinning or internal buckling and create or exacerbate irregularities. Most thermoplastic layers such as low-melting films, low-melting nonwovens, or other low-melting sheets or scrims frequently have built-in residual heat stresses, which are difficult to control even if heat is applied under lateral constraint. The films disclosed by the '854 patent to Etchison et al. are particularly susceptible to localized shrinkage when heated. Thus, unless the top and bottom surfaces are held in place while the film is melting in accordance with the present invention, shrinkage can magnify local web nonuniformities.

The inventive restrained, low pressure heating process allows the creation of exceptionally smooth and uniform needlepunched nonwoven fabrics that are also conformable, soft, flexible and durable. Furthermore, such fabrics have performances equivalent to costly resin-impregnated, resin-permeated, or adhesive-laminated structures, while leaving their outer surfaces stable, smooth and intact. Another advantage of the inventive restrained, low pressure heating process is that outer surface irregularities essentially disappear while the basic needled fibers remain intact. These unexpected advantages of the present inventive process represent advances over the prior art. Uneven outer surfaces can be formed by prior art techniques, such as the use of pin tenters, free heating within an oven or heating under high pressures using a calender (as disclosed, for example, in the '854 patent to Etchison et al. or the prior-related '769 or '377 patent applications). Further, such processes can project minor internal irregularities, such as needling pattern concentrations and web formation granularities, to outer surfaces.

Suitable staple fibers 16 for the process of this invention include, but are not limited to, polyester fibers, polyamide fibers, aramid fibers, and other fibers that do not melt or soften at temperatures under about 150° C., and that more preferably can stay intact above about 225° C. Also, preferably the melting point of the fibers 16 is at least about 10° C. to about 30° C., and preferably well over 50 degrees ° C. higher than the melting point of adhesive materials such as thermoplastic binder layer 14. Consequently, when the composite 10 is heated, the adhesive melts and flows with a reduced viscosity to attach itself to the fibers 16 passing through it, while the rest of the composite 10 stays immobile and intact.

Initially, the fibers 16 are usually arranged in a generally planar pattern, as seen in FIG. 1A. Alternatively, some of the fibers 16 may be arranged in more random orientations as in the case of airlaid webs. The needle-punching process realigns a number of fibers legs substantially normal or perpendicular to the composite 10 or the binder layer 14. According to the present invention, the orientation of the fiber legs relative to the binder layer 14 remains substantially unchanged after the composite 10 is heated. The needling density reaches at least about 40 penetrations per $cm^2$, preferably 200 penetrations per $cm^2$, more preferably 300 penetrations per $cm^2$, or 400 penetrations per $cm^2$, and can reach as high as 500 penetrations per $cm^2$. Multiple webs, multiple superposed adhesive sublayers, and multiple needling steps can be used to accumulate the preferred final fiber-end density and the preferred needle penetration density. The final needle-penetration density is calculated as the sum of the individual densities. Lower surface 28 should be substantially covered by the needle-punched fibers so that binder layer 14 is not visible.

The low-melting thermoplastic adhesive layer 14 can be comprised of any suitable material, e.g., polyethylene, polypropylene, low-melt copolyester or copolyamide. Further, layer 14 can be in the form of a film, fabric, or paper, for example a nonwoven fabric, or a layer of low-melt fibers. For instance, layer 14 can be a solid, porous or perforated film. A pre-perforated film can be fabricated by needling or low-temperature embossing, and it advantageously facilitates needlepunching penetration. Alternatively, layer 14 can be a combination of films that may or may not all melt at the same temperature, wherein at least one film acts as a barrier to melt flow propagation. In yet another alternative, layer 14 can be a fabric composed of low-melting fibers most or all of which melt at a low temperature, or it can be a fabric composed of bi-component fibers having a high percentage of low melting components. In yet another alternative, layer 14 can also be a low-melting scrim such as those used to laminate fabrics. Low-melting adhesive fabrics, including but not limited to meltblown fabrics, are suitable, especially because they offer low resistance to needle penetration compared to solid films. The adhesive fabric should be sufficiently stable so that its fibers are not driven by the needles to the lower surface 28.

In addition to thermoplastic adhesive layer 14, the composite 10 may further comprise low concentrations of uniformly-distributed adhesive within the fibrous layers, thus enhancing the integrity of the smoothened surfaces 26, 28 during subsequent processing or use. More particularly, the composite 10 may comprise low concentrations of secondary binder resin(s) in fibrous, fibril or powdered form intimately intermixed among the fibers 16 of the fibrous starting webs of the face layer 12 and bottom layer 18. The secondary binder resin may be a thermoplastic or thermoset material. The secondary binder resin may also be a sheath disposed around the core of the staple fibers in the webs to ensure that the resin is intimately intermixed within the fibrous webs. In accordance to another aspect of the present invention, the resin is activated in situ in the composite, preferably simultaneously with one or more central binder layers 14, 22, and has a melting point, or setting point, that is at least 10° C. lower, more preferably at least 30° C. lower, and most preferably at least 50 degrees ° C. lower than the melting point of the needlepunched fibers. In the interest of preserving softness, porosity, conformability and other mechanical properties, the secondary adhesive binders should be present in the composite 10 at very low levels. Particularly, in one exemplary embodiment, the secondary adhesive binders comprise no more than 25% of the weight, and preferably no more than 10% of the weight, of the fibrous starting webs of the face layer 12 and/or bottom layer 18.

In alternate embodiments of the invention, the above process can be also be used to form and finish needlepunched nonwoven fabrics from multi-layer composites 10 that comprise more than two layers including a fibrous bottom layer 18 with staple fibers 16, as shown in FIGS. 2A-2D. Face layer 12 and bottom layer 18 are placed simultaneously, or sequentially, over and under the adhesive layer 14, as indicated in FIG. 2A. Subsequently, face layer 12 and bottom layer 18 are needlepunched, as shown in FIGS. 2B and 2C. Next, heat is applied to composite 10 under planar restraint, and the resulting molten thermoplastic is confined to a thickness "h" that is smaller than or equal to about one-third of the thickness "H" of the whole composite 10, as shown in FIG. 2D. Alternatively, multiple face layers 12 and/or multiple bottom layers 18 can be used. Each layer can be needle-punched separately to increase penetration density, or all the face and bottom layers can be needle-punched together.

In another aspect of the invention, the composite comprises a bottom layer 18 having a starting nonwoven web that is stitchbonded by a yarn network. Suitable stitching yarns include, but are not limited to, (i) highly inextensible yarns such as hard of flat yarns, (ii) non-elastomeric stretch yarns such as textured yarns that have crimps formed on the yarns or stretch yarns that are covered by textured yarns, (iii) elastomeric yarns such as Lycra® yarns, rubber, elastic yarns covered or wrapped with hard yarns (e.g., Lycra® covered with nylon) and the like and (iv) partially orientated non-elastomeric yarns. The resulting stitchbonded fabric can be unstretchable/unshrinkable or elastically or inelastically stretchable depending upon the choice of yarns, stitching conditions, and finishing conditions.

The degree to which composites using stitchbonded layers can be allowed to stretch or contract is dependent upon the needs of the end-use. In one particular embodiment of the present invention, the starting web of bottom layer 18, comprising unbonded staple fibers 16, is stitch-bonded with elastic yarns under tension. Various conventional stitching patterns, including two-bar stitch patterns such as chain-stitches (e.g., 1-0, 0-1 and the like) and laid-in stitches (e.g., 0-0, 2-2 and the like) can be used with the present invention. Other suitable stitching patterns are disclosed in U.S. Pat. Nos. 4,026,130, 4,015,451, 5,542,269, 5,557,950, and 5,619,869 among others. After stitching under tension, the tension can be released from the elastic yarn to cause the yarn to contract and the fibrous layer 18 to gather and buckle, thereby increasing the density of the fibrous layer 18. An elastic needlepunched composite of this type should not expand or contract, elastically or non-elastically, until after it is subjected to the fully restrained heating and cooling process, to avoid internal non-uniform densification or rarification. After the finishing process is complete, the product may be allowed to contract and buckle out of plane without disturbing internal uniformity, thereby remaining suitable for end-uses, such as protective clothing, which do not require a smooth planar surface.

As shown in FIGS. 3A-3C, reinforcing scrims 20 can also be introduced into the composite structure 10 by placing scrims 20 above (not shown) or below (as shown) the thermoplastic adhesive layer 14. The fibers of face layer 12 can be needlepunched as shown in FIG. 3B. Next, heat can be applied to composite 10 under planar restraint, resulting in a molten thermoplastic confined to a thickness "h" that is smaller than or equal to about one-third of the thickness "H" of the whole composite 10, as shown in FIG. 3C. The scrims 20 can contain shrinkable elements, which can only be allowed to shrink after the heat-setting operation is complete and the product is cooled without shrinking. Such shrinkable elements include elastic or inelastic yarns, or layers within the scrim. Advantageously, shrinkage after heating and cooling composite 10 will leave the internal structure of composite 10 intact and uniform. Consequently, the nonwoven fabric may assume a wavy form, which is appropriate for coating if held flat under tension, and suitable for other uses such as apparel or filtration in a wavy or flat configuration.

In another embodiment of this invention the molten thermoplastic adhesive layer 14 is constrained or blocked from vertical propagation by placing thin barriers over or under the adhesive layer 14. Examples of such barriers include thin fluoropolymer films, scrims, membranes, or coatings.

As shown in FIGS. 4A-4C, composite 10 may comprise a face layer 12 with staple fibers 16, one thermoplastic binder layer 14 and at least one additional thermoplastic binder layer 22, and scrims 20. Advantageously, the centralized placement of layers 14, 22 allows one or more secondary layers 24 to be positioned adjacent to layers 14, 22. For instance, one or more secondary layers 24 can be placed above or below a single adhesive layer, or as shown in FIGS. 4A-4C between two adhesive layers 14 and 22, without excessively stiffening composite 10 or impeding its flexibility, conformability or moldability. Such secondary layers 24 may include reinforcing scrims, which may be extensible, inextensible or even elastic. The secondary layers 24 themselves may be in an unbonded, non-integrated or loose form, and contained by the adjacent activated thermoplastic adhesive layers 14, 22. The secondary layers 24 may comprise elements including, but are not limited to, powders, pulps, flocs, particulates, fibrids or mixtures, which provide desirable properties such as gas absorbency, oil absorbency, water absorbency, odor absorbency, particle filtration control, bacterial control, electromagnetic properties, and controlled release of active substances. In other aspects of the present invention, the secondary layer 24 can be a fibrous layer made from flat or textured yarns, a reinforcing layer, a thermal insulator, electrical conductor, a fire-retardant material, scented material, a superabsorbent material, a foam layer to absorb impact, or can have any other desirable property. In this embodiment, secondary layer 24 comprises the finishing substances.

As shown in FIG. 4B, staple fibers 16 can be needlepunched through one or more secondary layers 24. Subsequently, heat can be applied to composite 10 under planar restraint, resulting in a composite wherein molten thermoplastic confined to a thickness "h" that is smaller than or equal to about one-third of the thickness "H" of the whole composite 10, as shown in FIG. 4C. The key advantage of this inventive step, i.e. heating with planar constraint under low and uniform pressure, is that the fine-scale uniformity of such unbonded secondary layers 24 is preserved, whereas finishing by calendering can imprint needling or web irregularities into the layer and destroy its uniformity.

FIGS. 4A-4C, as discussed above, illustrate another inventive facet of the present invention. More particularly, beyond allowing a smooth and uniform surface as well as a uniform internal structure that is suitable for coating artificial leather, this invention provides the possibility of using stabilizing materials or finishing substances that are active or functional but need containment and protection within an enveloping fibrous structure while maintaining their planar uniformity. Examples of these are particulate layers such as pulps, fibrids, powders or floc layers containing active components that can be covered from one or both sides with thermoplastic adhesive and surrounded by fibers needlepunched through with fine needles without disturbing their fine-scale uniformity. Subsequent finishing by heating under restraint at low pressure preserves the uniformity of the entire structure and keeps it intact, while protecting the centrally immobilized active layer. Such finishing substances or active layers include electrically or magnetically active layers, antimicrobial layers, UV reflecting layers, superabsorbent layers, and the like.

The process of this invention, described above, allows the use of relatively high needling densities that result in dense coating surfaces for artificial leather as well as a protective apparel, and other wearable fabrics. Thus, one eliminates the need of using expensive special or ultra-fine fibers, expensive fabric forming and finishing processes, expensive elastic polymers, expensive impregnation and wet coagulation processes, or expensive brushing or sanding/buffing/brushing or shearing processes.

EXAMPLES

The present invention is now illustrated by examples of certain representative embodiments thereof, wherein all parts, proportions and percentages are by weight unless otherwise indicated. All units of weight and measure not originally obtained in SI units have been converted to SI units.

Example 1

Leather Coating Substrate, Finished with Low Pressure Under Planar Restraint

Polyester staple fibers 1.5 denier per filament (1.85 decitex) and 1.5 inches (or approximately 3.75 cm) long are carded, cross-lapped into a web with a basis weight of 9.0 oz/yd$^2$ (or approximately 305 g/m$^2$). The front face layer of the web is then needlepunched into two polyethylene films each weighing 4.0 oz/yd$^2$ (or a total of approximately 271 g/m$^2$), with a total of 2400 penetrations per square inch (or approximately 372 penetrations/cm$^2$). As a result, the bottom surface is fully covered with protruding fibers and the polyethylene films are centrally restricted in the middle of the composite. FIG. 5A is a photograph of the composite at this stage, which clearly shows that bottom surface 28 is fully covered by the needle-punched fibers or legs and that adhesive layer 14 is centrally restricted within composite 10.

Figure 5C:
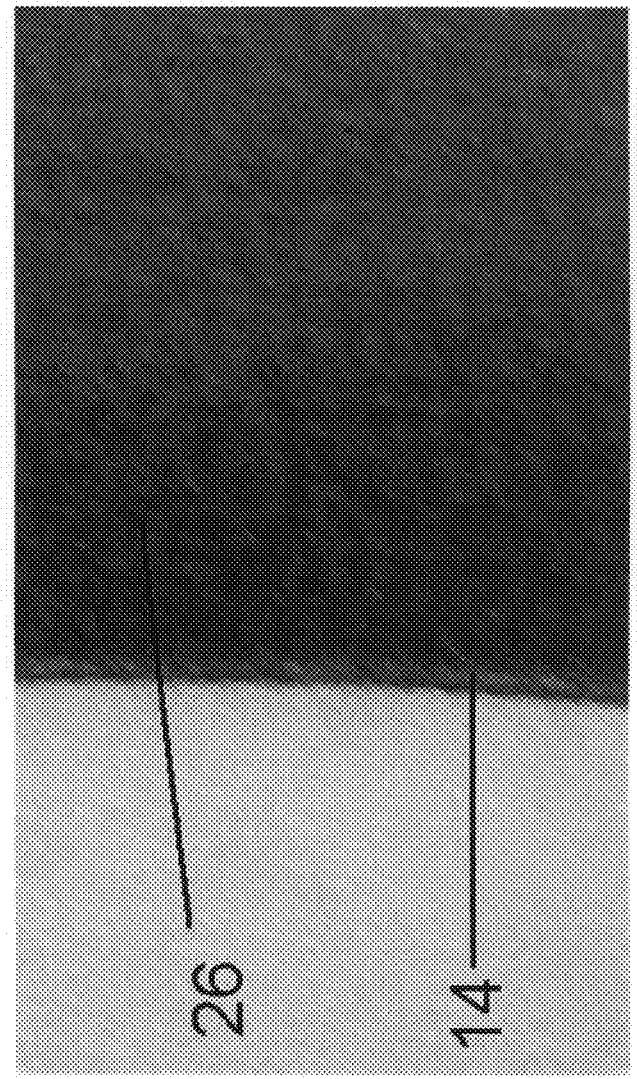
FIG. 5C is an enlarged portion of the precursor of FIG. 5B.

The composite is then heated to 380° F. (or approximately 193° C., or approximately 43° C. above the melting temperature of the two films) by feeding it through a dual-belt laminator with a final nip open at about 1 mm, and a minimum pressure of about 7.5 to 10 psi, using heat applied from above and below for a period longer than 70 seconds, and cooled within the laminator. The top and bottom surfaces of the product are very smooth and soft but crease-resistant, as shown in FIG. 5B. Adhesive layer 14 has been melted and re-solidified, but is still centrally restricted, as shown in FIG. 5C, which is an enlarged portion of FIG. 5B showing a part of the left edge of the composite. The needlepunched nonwoven product can be used as a substrate for a urethane coating for synthetic leather. Advantageously, this product does not produce any substantial aesthetically unpleasing "orange-peel" effect when stretched over curved surfaces. The "orange peel" effect is defined as an appearance or shading on a smoothly overcoated surface, similar to the appearance of the skin of an orange. Further, the product does not shrink or otherwise deform when subjected to temperatures up to about 190° C., thereby offering a significant and unique margin for further thermal processing into wearable items.

Figure 5D:
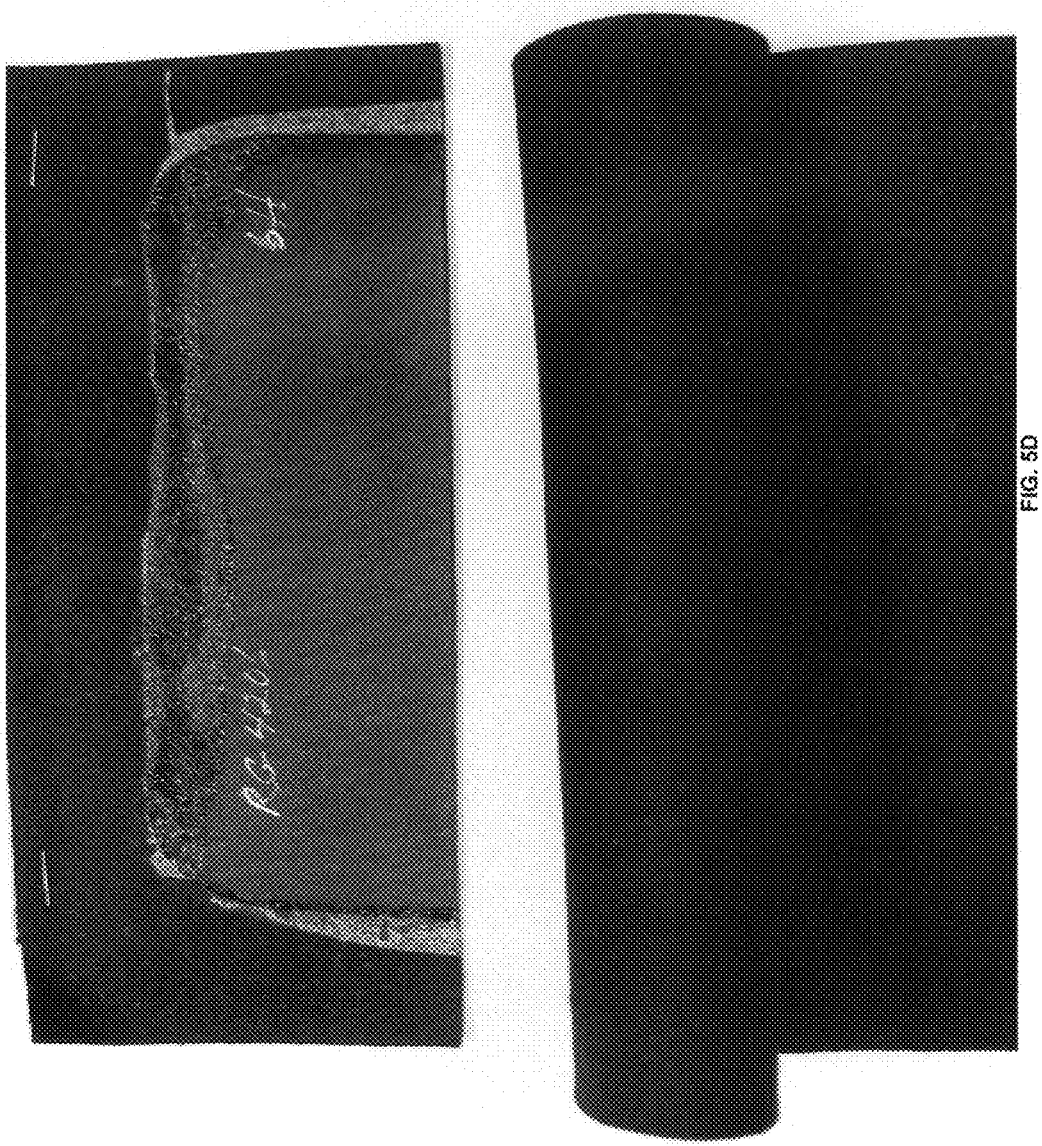
FIGS. 5D and 5E are photographs of a wearable product of example 1.
Figure 5E:
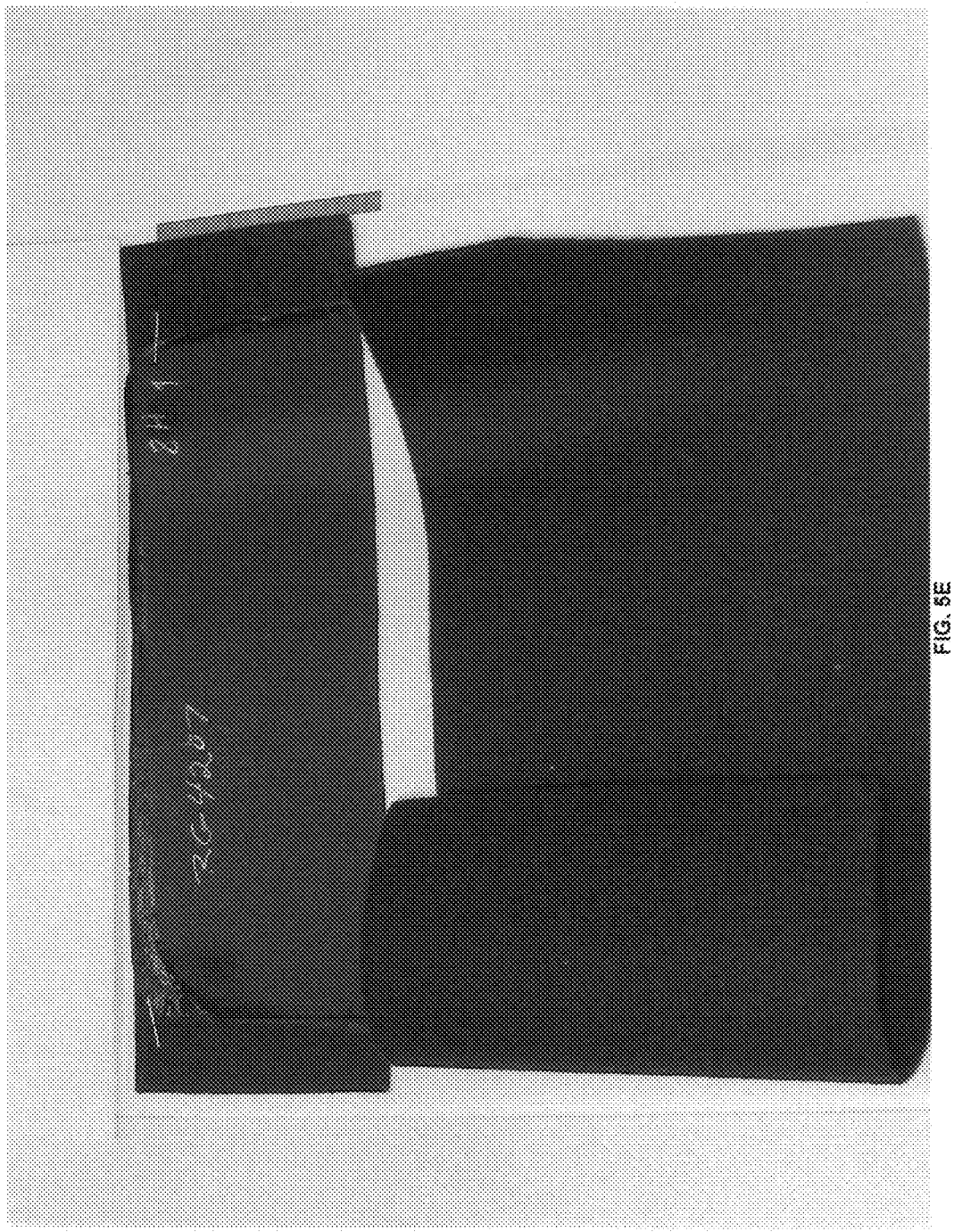

The precursor substrate can be used to form a synthetic leather. More particularly, a synthetic leather can be produced by applying an adhesive layer approximately two thousandths of an inch thick onto the needlepunched nonwoven composite and then casting a two thousandths of an inch thick layer of polyurethane. More particularly, the adhesive and polyurethane are dissolved in hot solvent and extrusion-coated onto release papers, which are then pressed against the precursor substrate and heated to drive off the solvent. FIGS. 5D and 5E comprises photographs of two different samples of the substrate with a layer of polyurethane coated thereon. In both FIG. 5D and FIG. 5E, the top portion depicts the a wearable product and the bottom portion depicts the precursor substrate, which is folded to illustrate both the top and bottom surfaces.

The finishing substance, e.g., polyurethane, can be applied onto composite 10 by any means known to those ordinary skilled in the art.

A readily recognizable advantage of the present invention is that since adhesive layer 14, 22 is centrally restricted, i.e., geographically restricted to the interior of composite 10, and since the amount of secondary adhesive, when present is relatively small, the top and bottom surfaces of composite 10 remain open and are capable of accepting the polyurethane cast (or other finishing substances or active material) to produce artificial leather.

Example 1A

Comparative to Example 1, Samples Finished Using a Calender

The needled precursor composite of Example 1 is finished through a smooth calendar heated to about 380° F., applying pressures ranging from about 100 lbs per linear inch to about 1,500 lbs per linear inch all without success. It was also found that when the needled composite was subjected to calendering after it is fed through a dual-belt laminator as per Example 1, it lost its uniformity. Neither trial produces a smooth product without showing the "orange-peel" effect before or after stretching over a curved surface. Additionally, all samples that have not been previously processed through the dual-belt laminator shrink and deform when heated to temperatures around 150° C.

FIGS. 6A-6C are a series of photographs illustrating the unpleasing "orange peel" of comparative Example 1A, which is surprisingly absent from the inventive examples shown in FIGS. 5A-5E. More particularly, FIGS. 6A-6C illustrate different products according to comparative Example 1A. More particularly, FIG. 6A is a photograph of a sample of comparative Example 1A finished through a smooth calender, applying a pressure of 500 lbs per linear inch. FIG. 6B is a photograph of a sample of comparative Example 1A finished through a smooth calender, applying a pressure of 1500 lbs per linear inch. FIG. 6C is a photograph of a sample of comparative Example 1A that is first pre-heated and then finished through a smooth calender, applying a pressure of 200 lbs per linear inch. In each of FIGS. 6A-6C, there is a noticeable "orange peel" in the samples corresponding to comparative Example 1A. Thus, unexpectedly, there is a demonstrable aesthetic advantage of the inventive process for making a patent leather substrate over conventional prior art methods.

Example 2

Reinforced Coating Substrate

Example 1 is repeated, except that a heat-set knit nylon fabric, having a basis weight of 1.8 oz/yd$^2$ (or approximately 61.0 g/m$^2$), is placed between the web and polyethylene film prior to needlepunching. The process and product characteristics are very similar to those of Example 1, except that the product is highly resistant to tearing.

Example 3

Elastic Odor Absorbing Durable Clothing

An assembly of multiple fabric layers is constructed according to the following process. A top layer is prepared from a blend of 80% 1.5 denier (or approximately 1.7 decitex), 1.5 inch (or approximately 3.8 cm) polyester fibers and 20% 2.2 denier (or approximately 2.4 decitex), 1.5 inch (or approximately 3.8 cm) sheath-core binder fibers, with the sheath melting at 110° C. The sheaths serve as the secondary binder, discussed above. The fibers are carded and lapped into a structure weighing 2.0 oz/yd$^2$ (or approximately 67.8 g/m$^2$).

A bottom layer is constructed by first preparing a web having the same composition as the first layer, except that the web weighs 1.0 oz/yd$^2$ (or approximately 33.9 g/m$^2$). The web is then stitchbonded using a 144 inch (or approximately 3.66 meter) wide, two-needle bar LIBA® stitchbonding machine. Each needle bar is 14-gauge; that is each bar has 14 needles per inch (or approximately 5.5/cm). The front bar of the stitching machine is threaded with an elastic yarn of 40 denier (or approximately 44 decitex) LYCRA® spandex (manufactured by E.I. du Pont de Nemours & Co. of Wilmington, Del.) wrapped with 40 denier (or approximately 44 decitex) textured nylon yarn, and the front bar inserts a pattern of 1-0, 0-1 stitches. The back bar is threaded with a stitching thread of 70 denier (or approximately 78 decitex), 33-filament textured nylon yarn and makes a pattern of 0-0, 2-2 stitches. The stitchbonded web is elastic in the machine direction and has a basis weight of approximately 2.0 oz/yd$^2$ (or approximately 67.8 g/m$^2$) when held under machine direction tension.

In addition to the top layer and the bottom layer, the fabric composite comprises a first binder layer, an intermediate active layer (or secondary layer), and a second binder layer. The first binder layer comprises a polyethylene film weighing 0.5 oz/yd$^2$ (or approximately 17.0 g/m$^2$), and is positioned immediately under the top layer. The intermediate active layer comprises carbon-impregnated paper weighing 2.5 oz/yd$^2$ (or approximately 84.8 g/m$^2$), and is positioned immediately under the first binder layer. The second binder layer also comprises a polyethylene film weighing 0.5 oz/yd$^2$ (or approximately 17.0 g/m$^2$), and is positioned immediately under the intermediate active layer.

With the bottom web layer held flat under machine-direction tension, the five-layer assembly is needlepunched from the top layer using approximately 800 penetrations per square inch (or approximately 124 penetrations/cm$^2$). Fibers from the top layer pass through the entire five-layer assembly, resulting in fibers protruding from the bottom layer. The composite is then heated to 380° F. (or approximately 193° C.) by feeding it through a dual-belt laminator with a final nip open at about 1.5 mm (minimum pressure).

The resultant fabric is softened and slightly gathered after placing it in a washer and dryer. The final fabric has many advantageous properties including durability, washability, softness, and machine direction elasticity (approximately 25% recoverable stretch). Also, advantageously, the final fabric is odor and gas-absorbent due to the carbon impregnated paper.

Due to the restriction of adhesive layers 14, 22 to the interior of composite 10, the odor can pass through the open top and bottom surfaces of composite 10 to be absorbed by the carbon-impregnated paper 24. The two adhesive layers when melted sandwich and retain the carbon-impregnated paper therebetween.

Example 3A

Comparative to Example 3

The needled composite of Example 3 is finished through a smooth calender, applying pressures ranging from 100 lbs per linear inch to 1,000 lbs per linear inch. In two separate trials, the needled composite is subjected to calendering before and after it is fed through a dual-belt laminator as per Example 3. In both trials, the internal structure of the central carbon-impregnated layer loses its uniformity, as evidenced by variable light showing through it and from its lower gas absorbing efficiency. FIG. 7 is a photograph of both inventive example 3 and comparative example 3A.

A dynamic simulated gas absorption test was used to measure the gas absorbing efficiency of Example 3 and Example 3A. The test uses multiple challenges to penetrate a sample with evaporated solvent at a level detectable in plain air. A minimum rating of 1.8, representing approximately 18 minutes of resistance, is considered acceptable. Example 3 passed with a 2.5 rating, whereas Example 3A failed with a 1.0 rating.

The disclosure of this invention incorporates all the express and inherent features and properties of the Examples disclosed herein, including but not limited to those illustrated in the accompanying drawings and photographs Although specific forms of the invention have been selected for illustration in the drawings and photographs and the preceding description is drawn in specific terms for the purpose of describing these forms of the invention fully and amply for one of ordinary skill in the pertinent art, it should be understood that various substitutions and modifications which bring about substantially equivalent or superior results and/or performance are deemed to be within the scope and spirit of the following claims.

What is claimed is:

1. A process of forming a wearable and functional fabric comprising the steps of:
   a. fabricating a precursor fabric by a process comprising the steps of:
      (i) providing a composite comprising at least one web of staple fibers, and at least one thermoplastic binder layer, wherein the melting point of each thermoplastic binder layer is lower than the melting point of the staple fibers, and wherein the composite comprises an upper and lower surface;
      (ii) needlepunching the staple fibers from at least one web of staple fibers into and through at least one thermoplastic binder layer, wherein ends of fibers originating from the needle-entrance side substantially cover the opposite needle exit-side, and wherein the density of needlepunching penetrations is greater than about 40 penetrations per cm$^2$;
      (iii) restraining the composite between two smooth surfaces of an apparatus, which are positioned to apply uniform pressure under about 50 psi throughout the upper and lower surfaces; and
      (iv) heating the composite, while continuing to restrain the composite, for a finite time period to remove the thermal stresses in the composite, wherein each thermoplastic binder layer is fully melted and the staple fibers are not melted, deformed or decomposed, wherein all molten thermoplastic is confined to a thickness smaller than or equal to about one-third of the thickness of the whole composite, and wherein the molten thermoplastic does not extend into either the upper surface or lower surface; and b. providing the precursor fabric with at least one finishing substance to improve the wearability and functionality of the precursor fabric.

2. The process of claim 1, wherein the at least one finishing substance is selected from the group consisting of polyurethane, vinyl, acrylic, carbon paper, gas or odor absorbing materials, fragrance releasing materials, ultraviolet protective materials, thermal insulators, fire-retardant materials, electrical conductors, electrical insulators, heating elements, anti-microbial materials, electromagnetic or microwave insulators, and combinations thereof.

3. The process of claim 1, wherein step (b) occurs after step (iv).

4. The process of claim 1, wherein step (b) occurs before step (ii).

5. The process of claim 1, wherein in step (iv) the composite does not undergo planar expansion or retraction.

6. The process of claim 1, wherein in step (iv) the thermoplastic binder layer does not undergo deformation.

7. The process of claim 1, wherein the composite comprises a web of staple fibers positioned on the upper surface, and a web of staple fibers positioned on the lower surface.

8. The process of claim 1, wherein at least one of the upper surface or the lower surface comprises the at least one finishing substance.

9. The process of claim 1, further comprising at least one secondary layer positioned adjacent to at least one thermoplastic binder layer.

10. The process of claim 9, wherein the at least one secondary layer comprises the at least one finishing substance.

11. The process of claim 9, wherein the at least one secondary layer is a reinforcing layer.

12. The process of claim 9, wherein the at least one secondary layer comprises particulate unbonded material.

13. The process of claim 12, wherein the at least one secondary layer is positioned between two thermoplastic binder layers.

14. The process of claim 12, wherein the at least one secondary layer is positioned between a thermoplastic binder layer and a reinforcing layer.

15. The process of claim 14, wherein the reinforcing layer comprises shrinkable elements.

16. The process of claim 15, wherein the shrinkable elements comprises elastic material.

17. The process of claim 1, wherein the thermoplastic binder layer is a film having a melting point about 10° C. to about 50° C. lower than the melting point of the staple fibers.

18. The process of claim 17, wherein the film is pre-perforated.

19. The process of claim 1, wherein the thermoplastic binder layer is a foraminous scrim.

20. The process of claim 1, wherein the thermoplastic binder layer is a fabric.

21. The process of claim 1, wherein the apparatus is selected from the group consisting of a dual-belt laminator, a flat hot press, and a rotating smooth heated drum wrapped with a smooth moving belt.

22. The process of claim 1, wherein the melting point of each thermoplastic binder layer is at least 10° C. lower than the melting point of the staple fibers.

23. The process of claim 1, wherein the melting point of each thermoplastic binder layer is at least 25° C. lower than the melting point of the staple fibers.

24. The process of claim 1, wherein the melting point of each thermoplastic binder layer is at least 40° C. lower than the melting point of the staple fibers.

25. The process of claim 1, wherein the at least one web of staple fibers further comprises a secondary thermoplastic or thermoset binder resin having a melting point lower than the melting point of the staple fibers.

26. The process of claim 25, wherein the secondary binder resin comprises less than 25% of the weight of the at least one web of staple fibers.

27. The process of claim 25, wherein the secondary binder resin comprises less than 10% of the weight of the at least one web of staple fibers.

28. The process of claim 1, wherein the pressure is under 20 psi.

29. The process of claim 1, wherein the pressure is under 10 psi.

* * * * *